Oct. 28, 1941.  R. E. POWELL  2,260,866
WELDING APPARATUS
Filed May 10, 1940
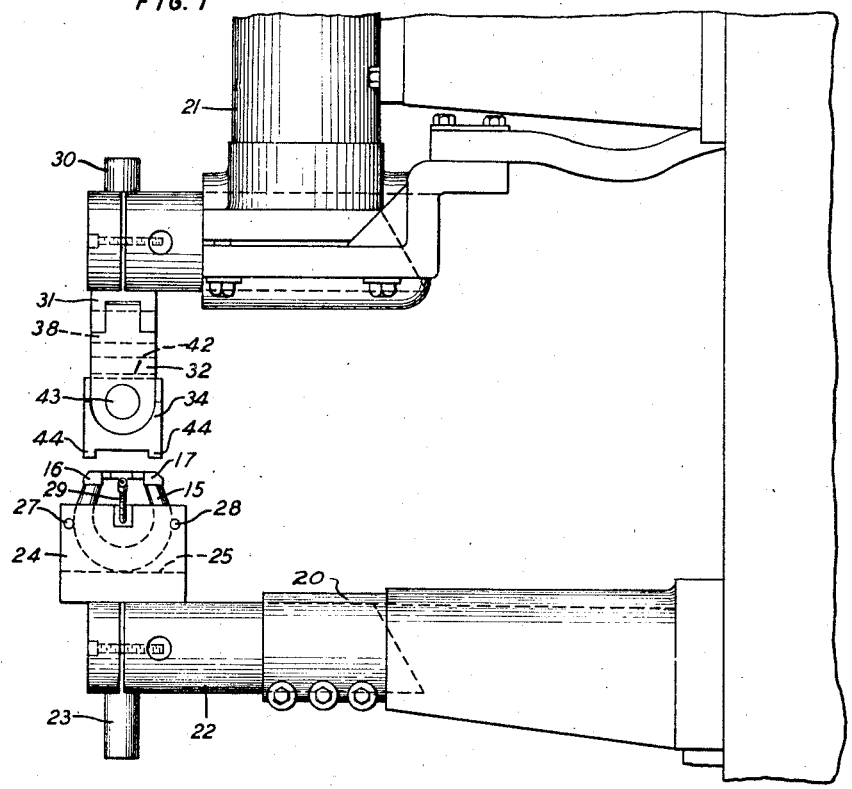
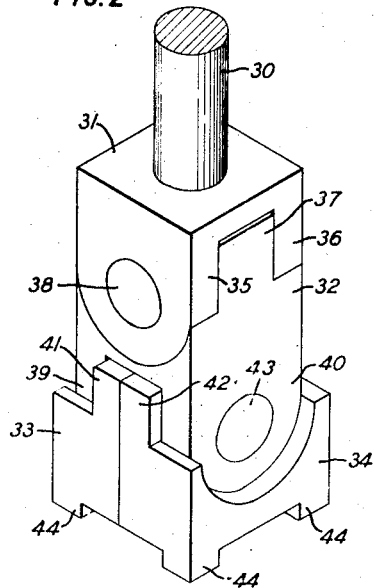
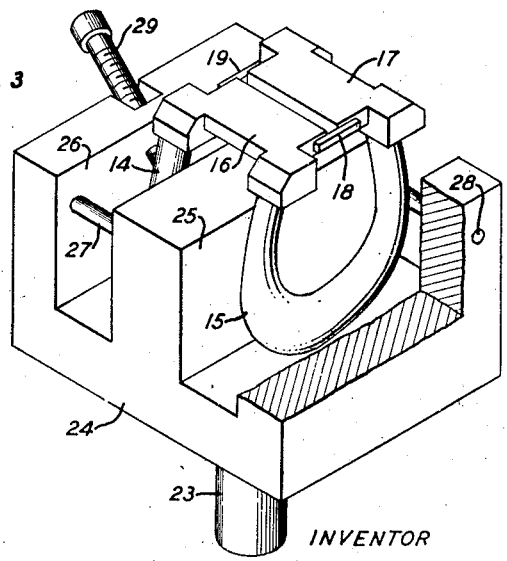
INVENTOR
R. E. POWELL
BY
E. R. Nowlan
ATTORNEY Patented Oct. 28, 1941

2,260,866

UNITED STATES PATENT OFFICE 2,260,866

WELDING APPARATUS

Raymond E. Powell, Westfield, N. J., assignor to Western Electric Company, Incorporated, New York, N. Y., a corporation of New York Application May 10, 1940, Serial No. 334,323

4 Claims. (Cl. 219—4)

This invention relates to welding apparatus, and more particularly to apparatus for electrical resistance welding adapted to make contact with the work simultaneously at several points.

Where two or more metal parts are to be welded together at several points simultaneously, there arises a problem of obtaining both equal mechanical pressures at the several points where welding is to occur and of supplying current satisfactorily and evenly to the same points. In resistance welding generally, there are provided two jaws or analogous members, usually of highly conductive metal such as copper or one of its suitable alloys, which are adapted to apply pressure to metal parts placed between them to be welded. Means are provided to exert the necessary pressure through the jaws, and means are provided to supply welding current, ordinarily of large amperage and low voltage to the jaws, to pass between the jaws through the parts to be welded and to heat the latter at their points or areas of mutual contact to welding temperature. Where a series of sets of like parts is to be welded in successive operations, because of minute differences in dimensions and in evennesses of contact, if the jaws are rigid in their approach to each other, the distribution of relative pressure among the several welding points of each set of parts to be welded will vary, with consequent excessive heating at some welding points and insufficient heating at others. Hence there arises the problem of providing means to transmit both mechanical welding pressure and electrical welding current simultaneously to a plurality of points on the work while providing for both compressional rigidity and a certain degree of angular flexibility at the work plane while avoiding the clumsiness and complexity entailed by members to form separate paths for the mechanical forces and for the electrical power required for the welding operations.

An object of the present invention is to provide an apparatus of the general class described in which the same flexible chain of elements is used to transmit both the mechanical pressure and the electrical power required for welding.

With the above and other objects in view, the invention may be embodied in a resistance welding machine in which one of the electrodes comprises two outer members each linked to one intermediate member by a pivot, the two pivots being at right angles to each other, and the three members being mutually formed and proportioned to simultaneously transmit both mechanical pressure and electrical current for welding.

Other objects and features of the invention will appear from the following detailed description of one embodiment thereof taken in connection with the accompanying drawing in which the same reference numerals are applied to identical parts in the several figures, and in which Fig. 1 is a partly diagrammatic view of the jaw portion of a resistance welding apparatus constructed in accordance with the invention;

Fig. 2 is an enlarged detached view in perspective of the upper electrode; and

Fig. 3 is a broken similar view of the lower electrode.

As therein illustratively described, the invention is applied in an apparatus for resistance welding together three metallic units of a magnetic device which includes two identically similar generally horseshoe-shaped magnets 14 and 15 of a highly magnetic alloy of iron, aluminum, nickel and cobalt with a compound pole piece comprising two identically similar parts 16 and 17 of low carbon steel. The two members 16 and 17 of the pole piece have been previously secured together and spaced apart with a predetermined gap between by non-magnetic tie members 18 and 19 of stainless steel. The problem now is to weld the pole pieces to the two magnets in the relation shown in Fig. 3. There are four welds to be made simultaneously where the double pole piece 16, 17 rests on the upturned ends of the two horseshoe magnets 14 and 15.

A press is provided of any suitable construction, of which only so much is disclosed as is required for an understanding of the invention, the structure and mode of operation of the press being no part of the present invention. For present purposes it is only necessary to note that the press is provided with a stationary bed member 20 and a ram 21 reciprocable at will toward and from the bed member. An electrode support 22 is mounted in the bed 20 and is adapted to removably receive and grip the downwardly extending integral stem 23 of a block like lower electrode 24.

The body of the electrode is formed in its upper side with two parallel vertical slots 25 and 26 to receive and support the magnets 14 and 15, which are further positioned therein by cross pins 27 and 28 and by jam screws 29 mounted in the outer walls of the slots. The magnets may, if necessary or advisable, be formed with flat surfaces at the several contacts which each has with the floor and inner side of the slot in which it stands, so that the total area of contact of each magnet with the body of the electrode may be greater than the area at the welding contacts with the pole piece.

The pole piece is laid in position as shown with or without a small pellet, disk or other body of auxiliary welding material, e. g. nickel, interposed at each of the four welding points.

The lower end of the ram 21 is provided with means to grip a stem 30 extending upwardly from a compound upper electrode body comprising four interlinked members 31, 32, 33 and 34, all preferably made, as is also the lower electrode body 24, of a relatively hard and rigid and relatively high conductivity material, such as an alloy of about 99.6% copper with about 0.4% chromium.

The electrode member 31 is integral with the stem 30, and is bifurcated as at 35 and 36 at the bottom to receive a corresponding tongue 37 projecting up from the member 32. The members 31 and 32 are pivotably secured together by a pin 38 through the forks 35 and 36 and the tongue 37. The pin 38 may be of steel or of the same alloy as the members 31 and 32. The member 32 is also bifurcated at its lower face with forks 39 and 40 to receive matched tongues 41 and 42 extending up from the matched members 33 and 34. The plane of the bifurcation of member 32 is at right angles to that of the bifurcation of member 31. The members 33 and 34 are linked to the member 32 by a pin 43 similar to the pin 38 but at right angles thereto.

Each of the forks 35 and 36 terminates in a convex arc concentric with the axis of the pin 38 and mated with a corresponding arcuate shoulder on the member 32. There is a small clearance between the top of the tongue 37 and the body of the member 32 so that the member 32 is free to pivot a little with respect to the member 31. When the member 31 presses down on the member 32, the pressure may be transmitted through the pin 38 or through the curved ended forks 35 and 36. In the first case there may be a slight clearance between the forks and their corresponding shoulders; in the second case there may be a trifling looseness of the pin 38 either in the forks 35 and 36 or in the tongue 37 or both.

The two members 33 and 34 are similarly pivotable, independently of each other, on the member 32. They are also formed on their under face with four contact lugs 44 to rest on the pole pieces 16 and 17 directly over the respective four welding points.

A suitable source of electric welding current, not shown, is connected to supply current to the stems 23 and 30 and thus to the electrode members 24 and 31.

In applying the present invention, it is found that, if the pins 38 and 43 are themselves sufficiently large and have sufficiently large bearings in the members which they link together, welding current can be transmitted from the stem 30 to the contact lugs 44 in an entirely satisfactory manner, without overheating or harmful arcing or sparking, the current passing from the body of the member 31 through the pin 38 into the tongue 37, and from the body of the member 32 through the pin 43 into the tongues 41 and 42. Or, as suggested above, if the pins 38 and 43 be relatively loose in their bearings the current will pass freely through the arcuate bearings of the ends of the forks 35 and 36 into the corresponding shoulders of the member 32 and through the ends of the forks 39 and 40 into the corresponding shoulders of the members 33 and 34. It may also be that the current will divide between these two paths. In any event it is found that both mechanical welding pressure exerted by the ram 21 and welding current fed to the stem 30 can be transmitted together and simultaneously down through the compound universally jointed electrodes 31, 32, 33, 34 to the welding contacts 44 in an entirely satisfactory manner, without any necessity for a separate electrical path, as, for example, a flexible cable, or a plurality of such connected from the member 31 to the members 33 and 34.

The apparatus disclosed and described herein is illustrative and may be variously modified and departed from without departing from the spirit and scope of the invention as pointed out in and limited only by the appended claims.

What is claimed is:

1. An electrode for a resistance welding apparatus and adapted to simultaneously transmit mechanical welding pressure and electrical welding current and which comprises three metallic members in sequence, and means to link each member to the next to have pivotable freedom of motion with respect thereto, each linkage means serving to simultaneously transmit mechanical welding pressure and electrical welding current between the members linked thereby.

2. An electrode for a resistance welding apparatus and adapted to simultaneously transmit mechanical welding pressure and electrical welding current and which comprises a plurality of metallic members in sequence, and means to link each member to the next to have pivotable freedom of motion in one plane only with respect thereto, the plane of motion at one linkage being at right angles to the plane of motion at another linkage, and each linkage means serving to simultaneously transmit mechanical welding pressure and electrical welding current between the members linked thereby.

3. An electrode for a resistance welding apparatus and adapted to simultaneously transmit mechanical welding pressure and electrical welding current and which comprises two metallic members linked together by a pivot pin to have pivotable freedom of motion with respect to each other in one plane only, and a third metallic member similarly linked to one of the first named members with freedom of motion in a plane at right angles to the first named plane only.

4. An electrode for a resistance welding apparatus and adapted to simultaneously transmit mechanical welding pressure and electrical welding current and which comprises two metallic members linked together by a pivot pin to have pivotable freedom of motion with respect to each other in one plane only, and a pair of metallic members similarly linked side by side to one of the first named members with individual freedom of motion in a plane at right angles to the first named plane only.

RAYMOND E. POWELL.